United States Patent Office 2,727,928
Patented Dec. 20, 1955

2,727,928

STABILIZATION OF ALKYL PHENOL COMPOUNDS

Jacob J. Menn, Martinez, and Edwin G. Wallace, Walnut Creek, Calif., assignors to Shell Development Company, Emeryville, Calif., a corporation of Delaware No Drawing. Application December 23, 1953, Serial No. 400,109

19 Claims. (Cl. 260—624)

This invention relates to the stabilization of alkyl phenol compounds, it being particularly directed to a process for improving the resistance of said compounds against deterioration in color and odor with age.

The alkyl phenols, wherein at least one of the hydrogen atoms attached to the phenyl nucleus is replaced by an alkyl group, are normally light-colored compounds having a mild odor when freshly prepared. However, many of these compounds take on a definite discoloration when allowed to stand, at the same time acquiring a strong and rather unpleasant odor. This deterioration in quality is particularly manifest in the case of the polyalkyl phenols, many of which, especially the 2,4,6-trialkyl phenols, are employed as oxidation inhibitors in materials where it is important that there shall be no change in the color or odor of the resulting composition.

It is a general object of the present invention to provide a method for improving the resistance of alkyl phenols to deterioration in color and odor with age. A further object is to provide a method of this character which may be effectively employed in the treatment of polyalkyl phenols. The compound 2,6-ditertiarybutyl-4-methyl phenol, although possessing outstanding inhibitor qualities, is especially susceptible to yellowing and odor-development during storage, and it is a particular object to provide a method for improving the color- and odor-stability of this compound. The nature of still other objects of the invention will be apparent from a consideration of the descriptive portion to follow.

It has been discovered that the stability of alkyl phenol compounds against deterioration in color and odor can be greatly improved by treating said alkyl phenols with a polyfunctional acid of phosphorus compound, especially the polybasic acids of phosphorus and their salts or esters. As a result of this treatment, it is possible to produce from alkyl phenols, which would otherwise discolor and acquire an unpleasant odor after a short interval, stabilized alkyl phenols which are capable of being stored for many months without exhibiting any appreciable change in color or odor.

The polyfunctional acid of phosphorus compound employed in stabilizing the alkyl phenol can be selected from a wide variety of compounds. Representative stabilizer compounds of this type, any one or more of which can be used in the process of the present invention, are, in addition to the previously mentioned preferred polybasic acids of phosphorus and the salts and esters thereof, the monobasic phosphorus acid compounds which contain at least one additional functional group in the molecule, for example, an amino or hydroxyl group or the like.

Typical polybasic acids of phosphorus which have been found to be effective in stabilizing alkyl phenols according to the invention are, for example, the phosphoric acids, particularly ortho-, pyro- and hypo-phosphoric acids; phosphorus acid; hypophosphorus acid; and the polyphosphoric acids such as the polymeta-phosphoric acids $(HPO_3)_x$, and the polyphosphoric acids of the pyrophosphoric acid type having the formula $H_{x+2}P_xO_{3x+1}$. In these formulae $x$ is at least 2, generally 2 to 6, although other polyphosphoric acids can also be used. Another suitable type of polybasic acid of phosphorus is the primary phosphonic acids represented by the general formula $$R-\overset{O}{\underset{\|}{P}}(OH)_2$$

in which R is an organic radical linked to the phosphorus atom by a direct carbon-to-phosphorus bond, examples of such acids being, for instance, methane phosphonic acid, trichloromethane phosphonic acid, 3,5,5-trimethylhexyl phosphonic acid, benzene phosphonic acid, etc. Other suitable polybasic organic acids of phosphorus can also be used, it being preferable as a general rule to employ those which contain from 1 to about 12 carbon atoms per molecule.

Especially suitable salts of acid of phosphorus compounds are the alkali metal and ammonium salts, for example, mono-, di- and tri-ammonium, sodium, potassium and lithium phosphates, phosphites and polyphosphates. The alkali metal and ammonium ortho-phosphates have the advantage of being cheap, readily available and less corrosive than the free acid which, however, is somewhat more effective. Salts of polyphosphoric acids which are suitable stabilizer compounds are readily prepared, for example, by fusing mixtures of orthophosphoric acid salts with bases or by fusing mixtures of salts of monophosphoric acids and polyphosphoric acids. In this way a large number of different polyphosphoric acid compounds can be produced, each differing only slightly from its adjacent members of the series and all being effective in the process of the invention. Mixed salts as well as simple salts can be used, and with the polybasic polyphosphoric acids of high molecular weights the mixed salts having both monovalent and polyvalent anions are particularly suitable. Thus, mixed salts having alkaline earth metal or aluminum or zinc ions together with alkali metal ions, for example, the calcium-sodium or magnesium-potassium or aluminum-ammonium salts of high polyphosphoric acids, can be used advantageously. With such salts it is preferred that the ratio of monovalent anions to polyvalent anions present be high, as the water solubility is thereby improved. Representative examples of other suitable polyphosphoric acid salts are, for instance, sodium trimetaphosphate $(NaPO_3)_3$, sodium tetrametaphosphate $(NaPO_3)_4$, sodium hexametaphosphate $(NaPO_3)_6$, tetrasodium pyrophosphate $Na_4P_2O_7$, disodium dihydrogen pyrophosphate $Na_2H_2P_2O_7$, trisodium hydrogen pyrophosphate $Na_3HP_2O_7$, sodium tetraphosphate $Na_6P_4O_{13}$, the complex fusion product from two moles of monosodium dihydrogen phosphate and one mole of disodium monohydrogen phosphate $Na_8P_6O_{19}$.

Thiopolyphosphates may be used in place of or in conjunction with the foregoing salts. Examples of salts of this type which are useful are, for instance, sodium monothiotetraphosphate $Na_6P_4O_{12}S$ and sodium trithiotetraphosphate $Na_6P_4O_{10}S_3$. These compounds have the same general efficiency as the other water-soluble polyphosphoric acid compounds in improving the color and odor stability of alkyl phenols according to the invention.

Instead of the foregoing inorganic salts, amine salts of acid of phosphorus compounds can be effectively used as the stabilizing agent. Aliphatic, aromatic and alicyclic amines which can be primary, secondary or tertiary are suitable. Salts of acids of phosphorus and amines having 1 to 12 carbon atoms per molecule are generally preferred. Methyl, ethyl, isopropyl, tertiary butyl, cyclohexyl, phenyl and like amine salts of ortho- phosphoric, tetra phosphoric and hexameta phosphoric acids, for example, are effective stabilizer compounds, as are the ethylene diamine, morpholine, mono-, di- and tri-ethanolamine salts of these acids. Salts of substituted amines such as the alkylolamines, amino acids such as glycine, alanine, etc., morpholine ethanol, and the like are useful as the salts of either polybasic acids of phosphorus or monobasic acids of phosphorus such as meta phosphoric acid.

A wide variety of esters of acids of phosphorus are effective as stabilizer compounds in the process of the invention. Suitable esters are, for instance, orthophosphoric acid esters of water-soluble mono- and polyhydric alcohols such as ethyl, isopropyl and tertiary butyl alcohols, glycerol, glycol, pentaerythritol, polyvinyl and polyallyl alcohols, and the like. The polyphosphoric acid, e. g. the pyrophosphoric and tetraphosphoric acids, esters are equally suitable. Amino-substituted esters are an especially advantageous subgroup of esters useful in the new process. Esters of polyhydric alcohols or amino-substituted alcohols are the preferred meta-phosphoric acid esters. Thus, glycerol monometaphosphate, beta-aminoethyl metaphosphate, ethylene glycol dimetaphosphate and the like are suitable.

Another type of esters which are suitable is the phosphates of aliphatic esters of amino acids. U. S. Patent 2,103,558 describes a number of useful esters of this type prepared from orthophosphoric acid and esters of amino acids such as glycerol and sarcosin and having the general formula $(NX_2R'COOR)H_3PO_4$, wherein X is hydrogen or a substituent element or group, e. g. alkyl, aminoalkyl, imido-alkyl, chloro-alkyl, hydroxy-alkyl or the like, and R and R' represent alkyl, aralkyl, alicyclic or heterocyclic alkyl radicals. Addition products of methyl, ethyl, isopropyl, tertiary butyl and like esters of tyrosine, tryptophane, and creatine with orthophosphoric acid are typical useful compounds of this class which can be used in stabilizing according to the present invention. However, the corresponding products from metaphosphoric acid and the various polyphosphoric acids and their acid salts such, for instance, as mono-sodium dihydrogen pyrophosphate and the like, are equally useful in the new process.

Whatever the type of polyfunctional acid of phosphorus compound chosen as the stabilizer compound, it should be one which is soluble in the treating medium under the conditions of its application to the alkyl phenol being stabilized to an extent sufficient to form a solution containing at least 0.01% by weight of such polyfunctional compound based upon the alkyl phenol present.

The process of the present invention can be practiced with good effect in the case of any alkyl phenol. It is especially advantageous with alkyl phenols having an alkyl group of 2 to 20 carbon atoms in the molecule. Representative starting compounds of this type are the various cresols, o-, m- and p-ethyl phenol, p-propyl phenol, p-isopropyl phenol, p-tertiarybutyl phenol, 2,4-dimethyl phenol, 2-methyl-4-tertiarybutyl phenol, 2-tertiarybutyl-4-methyl phenol, 2-methyl-4-dodecyl phenol, 2,4-ditertiarybutyl phenol, 2,6-diethyl phenol, 2-methyl-6-tertiarybutyl phenol, 2,4,6-trimethyl phenol, 2,6-diethyl-4-methyl phenol, 2,4,6-triethyl phenol, 2,6-dipropyl-4-methyl phenol, 2,4,6-tripropyl phenol, 2,6-diethyl-4-tertiarybutyl phenol, 2-tertiarybutyl-4,6-dimethyl phenol, 2,4,6-tritertiarybutyl phenol, 2,4,6-triisopropyl phenol, 2,4,6-tritertiaryamyl phenol, 2-tertiarybutyl-4,6-ditertiaryamyl phenol, 2-tertiaryamyl-4,6-dimethyl phenol, 2-isopropyl-4,6-dimethyl phenol, 4-methyl-2,6-ditertiaryamyl phenol and 2,6-ditertiarybutyl-4-tertiaryamyl phenol. However, particularly good results have been obtained in the treatment and resultant stabilization of the polyalkyl phenols, many of which are given above. These polyalkyl phenols are prepared by conventional processes, the usual method being to heat phenol or an alkylated phenol derivative such as o-, m- or p-cresol with an alkene in the presence of an acidic condensing agent such as sulfuric acid, phosphoric acid, hydrogen chloride or ferric chloride, the alkene attaching to one or more of the carbon atoms of the phenyl nucleus, depending on the reactant proportions employed. The next step in the process is usually to neutralize the reaction mixture with aqueous caustic solution, following which the neutralized product is washed and, if desired, further purified, as by crystallizing the product one or more times from an alcoholic or other liquid solution. The products so obtained are normally light in color and possess little objectionable odor, although many darken rapidly and develop an objectionable odor as they are stored.

The alkyl phenol compounds are stabilized by treatment with an acid of phosphorus or salt thereof in the presence of a solvent for the stabilizer or for both the stabilizer and the alkyl phenol. When present in the molten condition, the alkyl phenol can itself act as the solvent, although other solvent media such as water, ethyl, methyl, isopropyl and various other alcohols, as well as ethers such as diethyl ether, methyl ether of diethylene glycol and the like, can be used. Thus, the stabilizer compound, in either the presence or absence of a solvent, can be added to a system wherein the alkyl phenol is present in the liquid condition. Again, a solution of the acid or salt can be added to the solid alkyl phenol compound. The details of several available treating methods will be set forth in the examples.

The amount of the stabilizing agent to be employed is susceptible to some variation. Thus, amounts as small as 0.01% of the acid or salt, in terms of the weight of alkyl phenol compound present, have given good results, although preferably there is employed at least 0.05% of the stabilizing additive. Again, good results have been obtained using amounts thereof as large as 5%, although for reasons of economy it seldom pays to use more than about 1% since any additional benefits so gained do not justify the added expenditure.

Particularly when using as the stabilizer compound an acid of phosphorus compound which is strongly acidic, it is desirable to control the conditions of treatment so as to avoid conversion of the alkyl phenol being stabilized. Thus, in such cases it is generally desirable to carry out the treatment at a temperature below about 125° C. in order to avoid any appreciable dealkylation of the alkyl phenol. Excessively long periods of treatment at the higher permissible temperatures are also preferably avoided, treatment times of not substantially more than 3 hours being preferred. When employing salts of acids of phosphorus, especially the preferred mono- and di-alkali metal and ammonium salts of phosphoric acid, or esters of phosphorus acids, higher temperatures and longer treating times can be used without danger of conversion of the starting alkyl phenol. As a general rule, temperatures of about 0° C. to about 100° C. and treatment times of about 2 minutes to 3 hours, preferably about 10 to 60 minutes, are advantageous when using either the free acids or the salts as stabilizer compounds.

It is a feature of the present invention that the stabilizing action exerted by the added acid or salt compound employed persists even though the stabilized alkyl phenol compound is thereafter given one or more of various washing or even recrystallization treatments with solvents which might otherwise be expected to remove any of the acid or salt stabilizer present. This is an advantage since the stabilizer can be added to the alkyl phenol compound at the convenience of the operator, and need not be added during the final treating steps. In some cases the latter are practiced only after the lapse of a considerable period following the original production of the alkyl phenol compound, during which period the phenol might otherwise have deteriorated in color and odor were it not for the stabilization treatment earlier practiced.

The process of the present invention is illustrated by the following examples:

EXAMPLE I

A. A quantity of 2,6-ditertiarybutyl-4-methyl phenol was prepared by alkylating p-cresol with isobutylene in the presence of a minor amount of concentrated sulfuric acid as catalyst. The acid alkylate produced in this manner was then neutralized with aqueous caustic solution and water-washed. The resulting product was then combined with an equal weight of a solvent made up of 85% isopropyl alcohol and 15% water at 60° C. The resulting solution was then cooled to room temperature, thereby crystallizing out the alkyl phenol. These crystals were recovered, washed with fresh quantities of the isopropanol solvent, and air dried. As indicated in the table which follows Example III, the crystalline product so obtained, which was originally white in appearance, and had a mild odor, became progressively darker as it was allowed to age. At the same time, its original mild odor changed in character and grew progressively more unpleasant.

B. Companion operations were conducted under the same conditions as those described in the foregoing paragraph, except that here the neutralized alkylate was washed for a period of 30 minutes not with water, but with a hot (80° C.) 1% aqueous solution of diammonium phosphate, the amount of wash solution employed being such that the quantity of diammonium phosphate stabilizer present amount to 0.3% by weight of the 2,6-ditertiarybutyl-4-methyl phenol. As will be seen from the following table, the crystalline product which had earlier been washed with the diammonium phosphate solution was little changed in color during the storage period. Its odor was also unchanged during this period.

EXAMPLE II

In this operation the 2,6-ditertiarybutyl-4-methyl phenol product, obtained on neutralizing and water-washing the 2,6-ditertiarybutyl-4-methyl phenol prepared by treating p-cresol with isobutylene in the presence of sulfuric acid, was mixed with 20% by weight of a solvent made up of 85% isopropyl alcohol and 15% water, the resulting liquid being maintained at 80° C. for one-half hour. At the end of this period the organic layer was separated and then cooled, with stirring, to room temperature to crystallize out the alkyl phenol. The crystalline product so obtained was twice washed with the alcohol-water solvent, after which the crystals were air-dried for two days. As indicated by the data present in the table, the crystalline product obtained in this manner rapidly deteriorated with age.

In companion operations conducted under otherwise the same conditions as described in the preceding paragraph, diammonium phosphate and sodium tetraphosphate ($Na_6P_4O_{13}$) were introduced along with the alcohol-water solvent media from which the product was crystallized. As shown in the table, each of these additives effectively stabilized the product against deterioration in color for the 18 weeks during which they were tested. In contrast with the product which had been similarly treated without these additives, there was no deterioration in either color or odor of the thus stabilized alkyl phenol.

EXAMPLE III

A mixture of caustic-neutralized 2,6-ditertiarybutyl-4-methyl phenol (1000 parts), isopropyl alcohol-water azeotrope (200 parts) and orthophosphoric acid (2.5 parts) was stirred vigorously at 80° C. for 30 minutes. The organic layer was separated by decantation and the trialkyl phenol was crystallized therefrom by cooling to ambient temperature with moderate stirring. The crystals were recovered by vacuum filtration and washed once with 100-part and twice with 50-part portions of isopropyl alcohol-water azeotrope. After drying at room temperature for four days, the crystals were stored in the dark. After 35 weeks of storage, the crystals were essentially unchanged in either color or odor. Their Gardner color, determined on the melted crystals, was less than one. Equally good results are obtained when tetraphosphoric acid is used in place of the orthophosphoric acid, but crystals from the same plant alkylation batch which were similarly treated without addition of a stabilizer deteriorated noticeably in color and odor in three weeks.

Table
STABILITY OF 2,6-DITERTIARYBUTYL-4-METHYL PHENOL

| Example No. | Stabilizer | Wt. Percent Stabilizer [1] | Gardner Color No.[2] of Melt After Storage for— | | | | | |
|---|---|---|---|---|---|---|---|---|
| | | | 0 weeks | 2 weeks | 4 weeks | 8 weeks | 14 weeks | 18 weeks |
| I-A | None | | 1 | 5 | 12 | 13 | | |
| I-B | Diammonium phosphate | 0.3 | 1 | 1 | 1 | 2 | | |
| II | None | | 1 | 2 | 4 | 6 | 8 | 8 |
| II | Diammonium phosphate | 0.3 | 1 | 1 | 1 | 1 | 1 | 2 |
| II | Hexasodium tetraphosphate | 0.3 | 1 | 1 | 2 | 2 | 2 | 2 |
| III | None | | 1 | 2 | 4 | 8 | 9 | 9 |
| III | Phosphoric acid ($H_3PO_4$) | 0.25 | <1 | <1 | <1 | <1 | <1 | <1 |

[1] Based on the 2,6-ditertiarybutyl-4-methyl phenol present.
[2] On the Gardner Color Scale, No. 1 corresponds to a nearly water-white liquid. No. 5 is a very pale yellow, and No. 10 is a deep yellow. This scale is defined in the reference work by Gardner and Sward, "Physical and Chemical Examination, Paints, Varnishes, Lacquers, Colors," 1950 ed., page 9. Published by Henry A. Gardner Laboratory, Inc., 4723 Elin St., Bethesda, Md.

EXAMPLE IV

In this operation fresh crystals of 2,6-ditertiary butyl-4-methyl phenol prepared in the manner described in Example I, paragraph A, are slurried at room temperature with one-third their weight of a 1% solution of trisodium phosphate in a solvent made up of 85% isopropyl alcohol and 15% water for about 30 minutes. The treated crystals, after recovery and drying as described in Example III, are stable in color and odor during long storage in which the untreated crystals become badly discolored and develop a strong unpleasant odor.

EXAMPLE V

In this operation untreated crystals, prepared as described in Example I, paragraph A, are placed on a Buchner funnel and washed at room temperature with one-sixth their weight of a 1% solution of dipotassium phosphate in the solvent used in Example IV. The washed crystals remain essentially white for at least 17 weeks and retain their initial mild odor substantially unchanged.

EXAMPLE VI

In plant scale tests of the process, diammonium phosphate was used to treat the product of alkylating para-cresol with isobutylene in the presence of sulfuric acid.

In one case, ten pounds of diammonium phosphate were added to 125 gallons of water used to tank-wash about 3000 pounds of neutralized alkylate and the phases were mixed by pump circulation for one hour at 85° C., after which the lower aqueous phase and the alkylate were recovered, crystallized and dried. In the other case, diammonium phosphate in an amount of 0.15% by weight, based on the alkylate, was added to the crystallizer in the form of a 35% aqueous solution, and the mixture stirred at 65° C. for one hour, after which the crystals were recovered and dried in the same way. Both products were completely stabilized and had a Gardner color for the melt of 1 after 12 weeks' storage, during which time there was no deterioration in odor.

Similar good results are obtained when sodium phosphite is substituted for the ammonium phosphate in these operations.

It will thus be seen that the process can be successfully carried out with a wide variety of acids of phosphorus and salts thereof, and it will be understood that the invention is not limited to the examples which have been given by way of illustration since any alkyl phenol having an alkyl group of at least two carbon atoms can be effectively stabilized with any of these stabilizer compounds.

This application is a continuation-in-part of our co-pending application, Serial No. 239,184, filed July 28, 1951, now U. S. Patent 2,672,485, issued March 16, 1954.

We claim as our invention:

1. The method for improving the color- and odor-stability of an alkyl phenol which tends to become discolored and to develop an odor with age which comprises treating said alkyl phenol with 0.01% to 5%, based on the weight of alkyl phenol, of polyfunctional acid of phosphorus compound at a temperature below 125° C. for a period between about 2 minutes and 3 hours at which no substantial conversion of said alkyl phenol takes place and recovering the starting alkyl phenol as stabilized product.

2. The method of claim 1 wherein the treatment is carried out in the presence of a liquid solvent for said polyfunctional acid of phosphorus compound.

3. The method for improving the color- and odor-stability of an alkyl phenol comprising washing said alkyl phenol with an aqueous alcohol solution of at least one polyfunctional acid of phosphorus compound at a temperature below 125° C., the amount of said phosphorus compound being 0.01% to 5% by weight of said alkyl phenol, and recovering the starting alkyl phenol as stabilized product.

4. The method for improving the color- and odor-stability of an alkyl phenol comprising crystallizing said alkyl phenol from a solution containing 0.01% to about 1%, based on the weight of alkyl phenol present, of polyfunctional acid of phosphorus compound at a temperature below 125° C., the amount of said phosphorus compound being 0.01% to 5% by weight of said alkyl phenol, and recovering the starting alkyl phenol as stabilized product.

5. The method for improving the color- and odor-stability of 2,6-ditertiarybutyl-4-methyl phenol comprising treating said alkyl phenol with at least one polyfunctional acid of phosphorus compound at a temperature below 125° C., the amount of said phosphorus compound being 0.01% to 5% by weight of said alkyl phenol, and recovering the 2,6-ditertiarybutyl-4-methyl phenol as stabilized product.

6. The method of claim 5 wherein the polyfunctional acid of phosphorus compound is phosphoric acid.

7. In the alkylation of a phenol by reaction with an alkylating agent in the presence of a catalyst, the method for improving the color- and odor-stability of the alkylated phenol which comprises separating the alkylated phenol from the alkylation mixture and contacting it with 0.01% to 5% by weight of a polybasic acid of phosphorus compound at a temperature of about 0° C. to 125° C. for a time between about 2 minutes and 3 hours at which no substantial conversion of said alkyl phenol takes place and recovering the starting alkyl phenol as stabilized product.

8. The method of claim 7 wherein the alkylated phenol is stabilized by treating it with 0.01% to about 1% by weight of orthophosphoric acid at about 20° C. to about 100° C.

9. The method of claim 8 wherein the alkylated phenol is a product of alkylation of a methyl phenol with an olefin of 3 to 20 carbon atoms in the presence of sulfuric acid as catalyst.

10. In the alkylation of paracresol by reaction with an isobutylating agent in the presence of an alkylation catalyst wherein 2,6-ditertiarybutyl-4-methyl phenol is produced, the method for improving the color- and odor-stability of the 2,6-ditertiarybutyl-4-methyl phenol which comprises separating the 2,6-ditertiarybutyl-4-methyl phenol from the alkylation mixture and contacting it for not substantially more than 3 hours with 0.01% to 5% by weight of a polybasic acid of phosphorus compound at a temperature of about 0° C. to 125° C.

11. The method for improving the color- and odor-stability of an alkyl phenol comprising treating said alkyl phenol with 0.01% to 5%, based on the weight of alkyl phenol, of a polybasic phosphoric acid salt.

12. The method for improving the color- and odor-stability of an alkyl phenol comprising treating said alkyl phenol with 0.01% to 5%, based on the weight of alkyl phenol, of an alkali metal phosphate.

13. The method of claim 12 wherein the alkali metal phosphate is hexasodium tetraphosphate.

14. The method for improving the color- and odor-stability of an alkyl phenol comprising treating said alkyl phenol with 0.01% to 5%, based on the weight of alkyl phenol, of an ammonium salt of a polybasic phosphoric acid ammonium salt.

15. The method of claim 14 wherein the ammonium salt is diammonium phosphate.

16. The method for improving the color- and odor-stability of an alkyl phenol comprising treating said alkyl phenol with 0.01% to 5% based on the weight of alkyl phenol, of a polybasic phosphoric acid salt of an amine having 1 to 12 carbon atoms per molecule.

17. The method for improving the color- and odor-stability of an alkyl phenol comprising treating said alkyl phenol with an ester of an acid of phosphorus having 1 to 20 carbon atoms per molecule, present in an amount equal to 0.01% to 5% by weight of said alkyl phenol.

18. The method of claim 17 wherein the ester is a hydroxy phosphate.

19. The method of claim 17 wherein the alkyl phenol is 2,6-ditertiarybutyl-4-methyl phenol.

References Cited in the file of this patent

UNITED STATES PATENTS

| | | |
|---|---|---|
| 2,223,549 | Harvey | Dec. 3, 1940 |
| 2,559,594 | Caplan | July 10, 1951 |

OTHER REFERENCES

Hart et al.: Jour. Organic Chem., vol. 15 (March 1950), pp. 396–9 (4 pages).